United States Patent [19]

Awai

[11] Patent Number: 4,922,385
[45] Date of Patent: May 1, 1990

[54] COOLED LIGHTING APPARATUS AND METHOD

[75] Inventor: George K. Awai, Haleiwa, Hi.

[73] Assignee: Fiberstars, Inc., Fremont, Calif.

[21] Appl. No.: 264,778

[22] Filed: Oct. 31, 1988

Related U.S. Application Data

[62] Division of Ser. No. 121,906, Nov. 17, 1987.

[51] Int. Cl.$^5$ .............................................. F21V 7/04
[52] U.S. Cl. ..................................... 362/32; 362/294; 362/373
[58] Field of Search ................ 362/32, 294, 345, 373, 362/293, 268

[56] References Cited

U.S. PATENT DOCUMENTS 3,733,481  5/1973  Kuyt ..................................... 362/32
3,775,606  11/1973  Bazell et al. .......................... 362/32

Primary Examiner—Stephen F. Husar
Attorney, Agent, or Firm—A. C. Smith

[57] ABSTRACT

An improved apparatus and method for illuminating optical fibers includes a bezel block for positioning the ends of optical fibers near an area of illumination that is isolated from the heat of the source of illumination and that is cooled by air flowing through the block. Heat is transferred from the source of illumination by flowing air which is controlled within an enclosure for maintaining low exhaust temperatures.

16 Claims, 5 Drawing Sheets

COOLED LIGHTING APPARATUS AND METHOD

CROSS REFERENCE TO RELATED APPLICATION

This is a division of pending application Ser. No. 121,906, filed Nov. 17, 1987.

RELATED APPLICATION

The subject matter of this application relates to the subject matter disclosed in U.S. Patent Application Ser. No. 000,113, now U.S. Pat. No. 4,763,984, entitled "Lighting Apparatus and Method" filed on Jan. 2, 1987, by George Awai and Michael Ernst.

BACKGROUND OF THE INVENTION

The present invention relates to the apparatus and method for illuminating optical fibers.

Optical fibers are known to the art in several forms. These include drawn and treated glass and various plastic fibers, any of which may additionally be clad or coated. These fibers, typically used in long bundles, transmit light from end to end over substantial distances. In the Related Application cited above, the optical fibers additionally provide lateral transmission of light which emerges from the sides of the fibers to provide illumination along the entire length of the fiber.

Many applications, such as those using multiple fibers in a bundle, require a light source or sources capable of providing light to more than one end of the fiber bundle. In the Related Application cited above, illumination is supplied at both ends to provide illumination by means of lateral emission of light along the lengths of the fibers, and it has been determined that illuminating both ends of such optical fibers provides more uniform illumination along the lengths thereof.

Light sources adapted to provide illumination to optical fibers suffer from a number of disadvantages. Many sources of illumination become overheated for applications involving plastic fibers, and where the light source is enclosed within a housing, the housing may become dangerously hot to the touch. In addition, the heat generated by the enclosed light source may damage various components of the lighting system including color filters and the optical fibers themselves.

This danger of overheating has sometimes been overcome by providing forced-air cooling and heat-reflective mirrors. Even with fans, previous designs in the prior art restricted the wattage of light bulbs used within the enclosure, typically, to less than 100 watts in order to avoid damaging the optical fibers and associated optical components. This power limitation is considered a serious disadvantage where high level illumination is required, such as where lateral transmission of light from fibers must be visually perceptible against ambient light levels.

It is desirable in some applications to provide a light-tight source of illumination for optical fibers. However, light-tight enclosures often contribute to the overheating problem since the enclosure usually interferes with the free flow of cooling air.

Illuminating more than one end of a bundle of optical fibers may be accomplished with a separate illumination source at each end with the ends of the bundled fibers presented to a focused light source. However, where fibers are simply bundled together, it may be difficult to attain regular and easily reproducible results since the bundling may vary from one installation to the next. Also, it is more difficult to radiate away accumulated heat where the fibers are bundled, thus leading to an increased likelihood of heat-related damage to the fibers.

SUMMARY OF THE INVENTION

In accordance with the present invention, an enclosed source of illumination for optical fiber cables is provided which eliminates overheating problems and which is light tight and which may conveniently illuminate a plurality of cable ends. In accordance with the present invention, a high intensity light source is arranged in housing that directs a stream of flowing air around the light source, the fiber ends and the associated components and that then causes the heated air to mix with ambient temperature air to assure low-temperature operation and a low-temperature exhaust of air from the enclosure.

DETAILED DESCRIPTION OF THE PREFERRED EMBODIMENT

Figure 1:
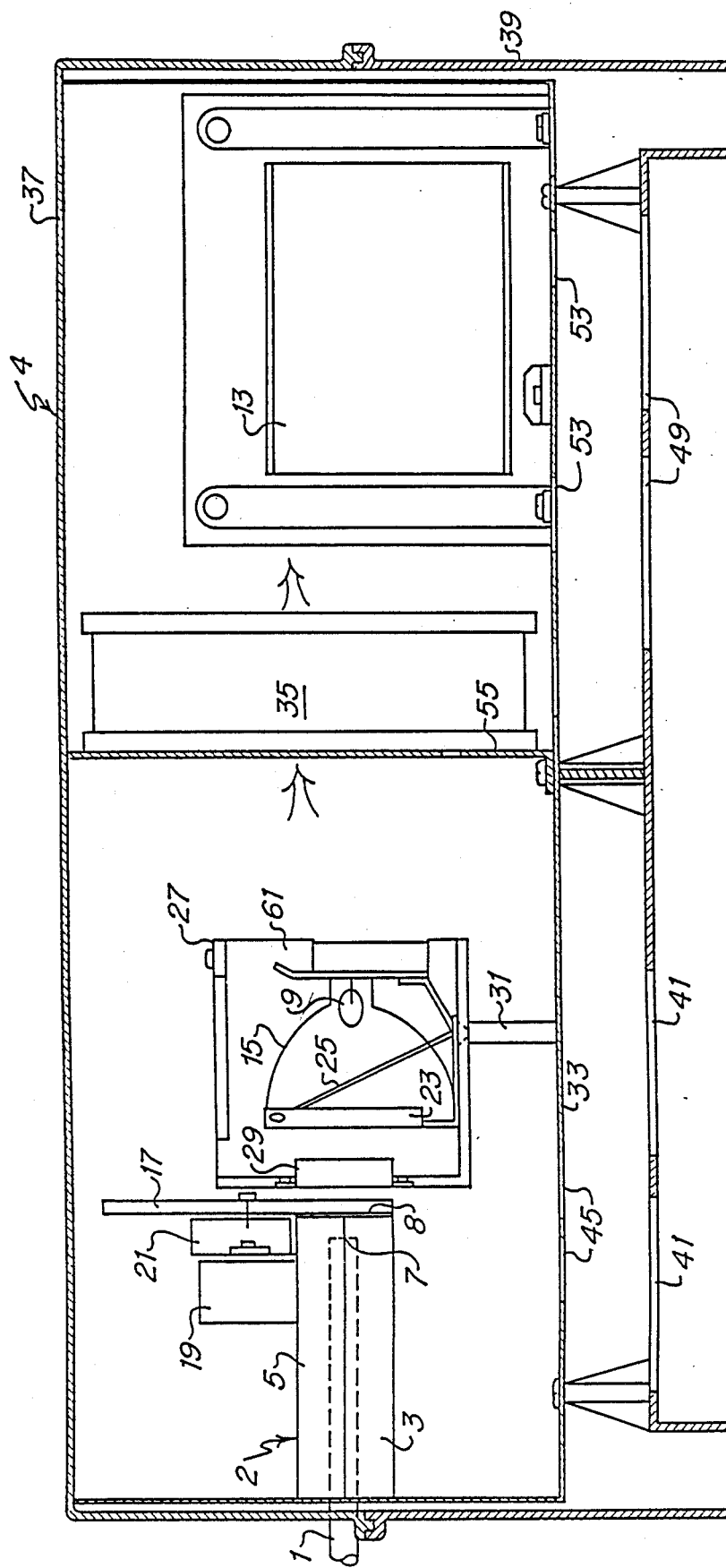
FIG. 1 is a cut-away sectioned view of the light housing for illuminating optical fibers according to the present invention.
Figure 5:
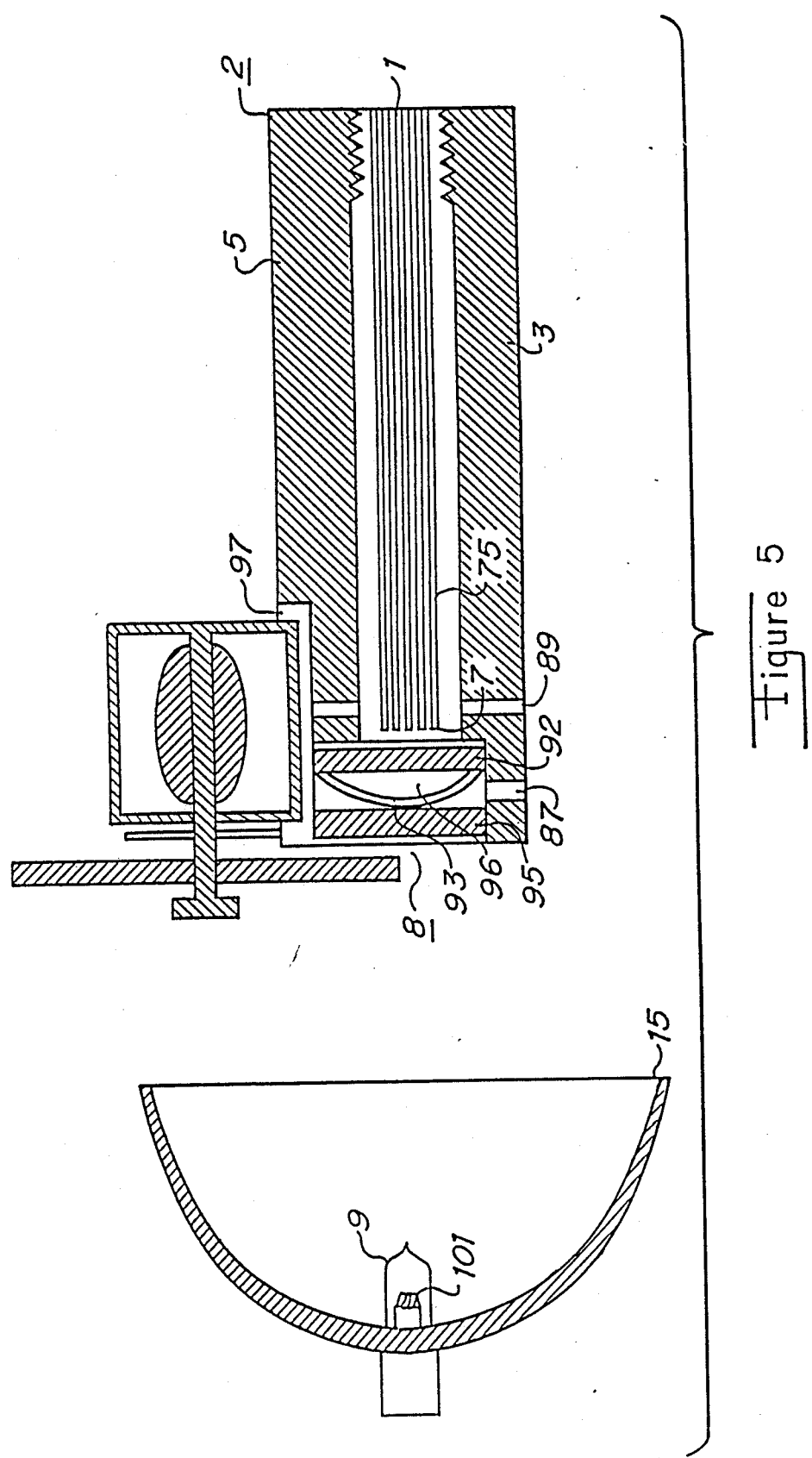
FIG. 5 is a side sectional view of the block of FIG. 3 showing the cooling passages therethrough.

Referring now to FIG. 1, there is shown a cutaway view of the housing according to the present invention. A bundle or cable 1 of optical fibers is positioned within a bezel block 2 consisting of a lower part 3 and upper part 5 such that the optical cable 1 has a near end 7 adjacent the optical window 8 of the bezel block 2 positioned to receive light from light source 9 through the window 8, as illustrated in FIG. 5. The optical cable 1 may consist of one or many fibers which, as detailed below, may be separated into bunches or bundles. Light from the light source 9 enters the optical cable 1 at the near end 7 and is transmitted along the length of the optical cable 1 for external illumination applications.

The light source 9 may be a quartz-halogen bulb which may be energized in conventional manner using a line-voltage stepdown transformer 13. The light source 9 includes an ellipsoidal reflector 15 which focuses the light on the near end 7 of the optical cable 1. The reflector 15 is formed of a dichroic material which will reflect the desired visible light toward the cable 1 but which will transmit the undesired infrared so as to avoid heat buildup near the end of the optical cable 1 which may be damaged by excessive heat. A window 29 of dichroic material which transmits visible light but reflects heat may be introduced into the light beam between light source 9 and bezel block 2 to prevent heat build up near the end of the optical cable 1.

The reflector 15 is provided with a mounting flange 23 and brace 25 in order to maintain the light source 9 in position relative to the bezel block 2.

A rotatable color wheel 17 may optionally be introduced into the light path between source 9 and bezel block 2 to effect a pleasing variation in the color of light transmitted to the optical cable 1. The wheel 17 may be rotated by means of a motor 19 and is preferably composed of a dichroic material which will transmit the desired colors and reflect the remaining colors including infrared. Such dichroic materials are found to be more effective in preventing the heat buildup near the cable ends than filters consisting of colored glass or gel. The light source 9 and reflector 15 are mounted within an enclosure 27 having a heat-reflective window 29 to permit the illumination of the optical cable 1. The enclosure may be mounted on a standoff 31 which is fastened to the chassis 33.

A fan 35 is positioned downstream of the light source 9 within the housing 4 to promote air circulation by creating an air stream through the housing 4. The housing includes an upper case 37 and a lower case 39 and includes primary entrance holes 41 and primary chassis holes 45 located upstream of the light source 9 to permit the flow of air through the housing. Additionally, case exhaust holes 49 and chassis exhaust holes 53 provide exit passages for heated air from the interior of the housing. As discussed below, the holes through the housing 4 should be large relative to the holes through the chassis 33 so that the direction and speed of the airflow may be determined by the size and placement of the chassis holes.

In operation, the fan 35 creates a pressure differential for moving air through the housing 4. The fan 35 and the bracket 55 upon which it is mounted will preferably closely fit the interior dimensions of the housing to promote flow of air within the housing entirely through the fan 35.

Air at ambient temperature is drawn through the primary entrance holes 41 and through the smaller chassis holes 45 which are oriented in close proximity to the hot light source 9. The use of small holes relative to the airflow generated by the fan 35 causes a relatively high-speed stream of air at ambient temperature to enter the interior of the housing. By suitably positioning the chassis holes 45 the stream of air at ambient temperature air may be directed toward the components such as the bezel block 2 and the light source 9 and reflector 15 within the enclosure 27 for which cooling is most crucial. The enclosure 27 includes vents 61 to direct the passage of cooling air therethrough and around the light source 9.

It has been found that air flowing at high speed across the hot light source 9 is preferred over passing large volumes of air at low speed over the light source 9 for removing heat from the source. Thus, the various holes described herein are sized to develop high-speed air streams.

At least one hole 45 in the chassis 33 is positioned to direct a flow of air across and through the bezel block 2 as discussed more fully below.

It has been found that the passage of air across the hottest elements (i.e. the light source 9, reflector 15, and bezel block 2) causes flowing air to undergo a large rise in temperature, on the order of 60 degrees Fahrenheit for a bulb of approximately 100 to 150 watts rating. Where the ambient temperature of air exceeds 70 degrees Fahrenheit, this heating of the air circulating within housing 4 may contribute to failure of such components as the fan 35, the color wheel motor 19 and the stepdown transformer 13 due to overheating. Additionally, the housing 4 may become uncomfortably or dangerously hot to the touch. If the fan 35 generates a circular airflow against the top, back, and bottom of the interior of the housing, there may be relatively little airflow that is within the central region of the housing while much heat is transferred to the exterior of the housing.

Figure 2:
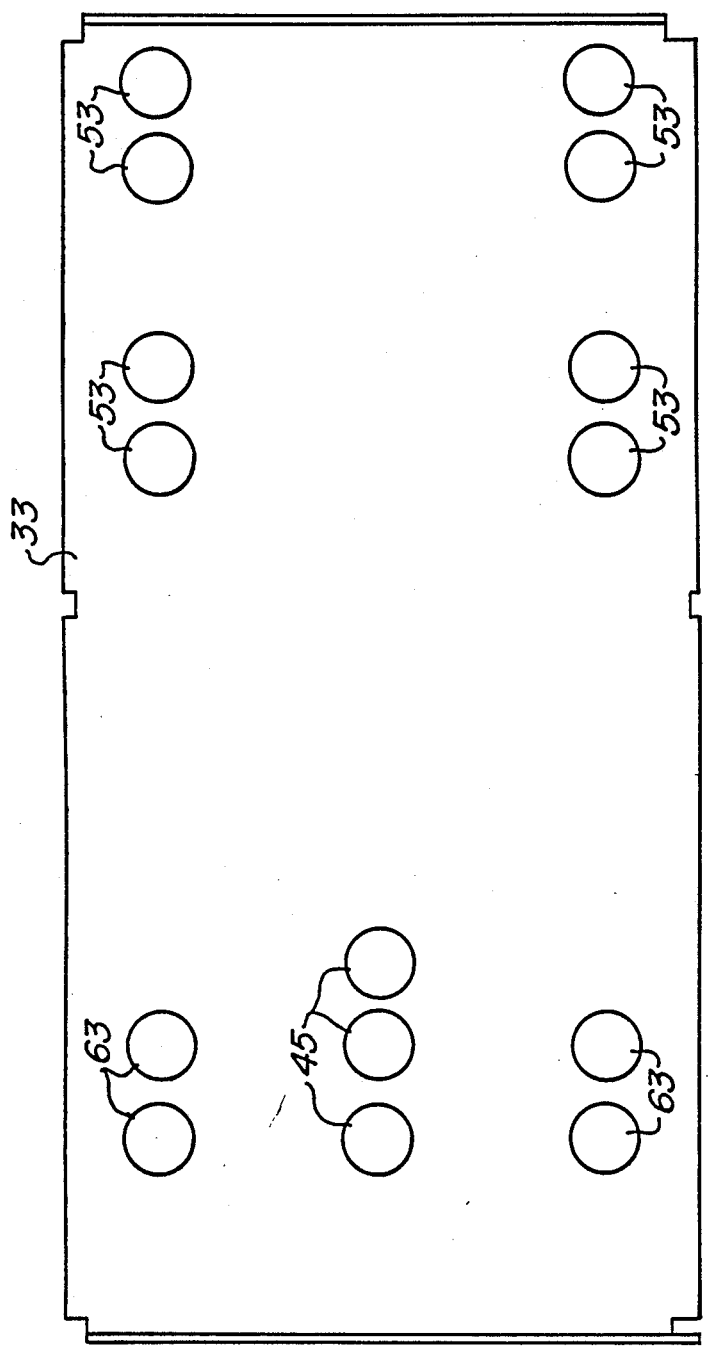
FIG. 2 is a plan view of the underside of a chassis constructed according to the present invention.

Referring additionally now to FIG. 2, the chassis 33 is provided with auxiliary holes 63 located upstream of the fan 35. These holes 63 assist in the general cooling of the structure according to this invention by admitting air at ambient temperature which mixes with the heated air that has already passed over and through the light source 9, bezel block 2 and reflector 15. This mixing of high-speed heated air with air at ambient temperature results in larger volume of exhaust air at lower temperature. This lower-temperature air is less likely to cause overheating failures of the fan 35 and other components. Additionally, lower temperature air is less likely to transfer heat to the exterior case 37, 39 so as to cause the exterior surfaces to become hot.

It has been found that a fan 35 with an air-flow rating of 90 cubic feet per minute adequately cools the housing 4 and components that are constructed and arranged therein according to the present invention using a light source 9 comprising an incandescent bulb rated at 200 watts and having three three-quarter inch diameter primary holes 45 and four three-quarter inch diameter auxiliary holes 63, the external temperature of an apparatus thus constructed and arranged has been found to operate at approximately 100 degrees Fahrenheit with air at an ambient temperature of 70 degrees Fahrenheit.

Figure 3:
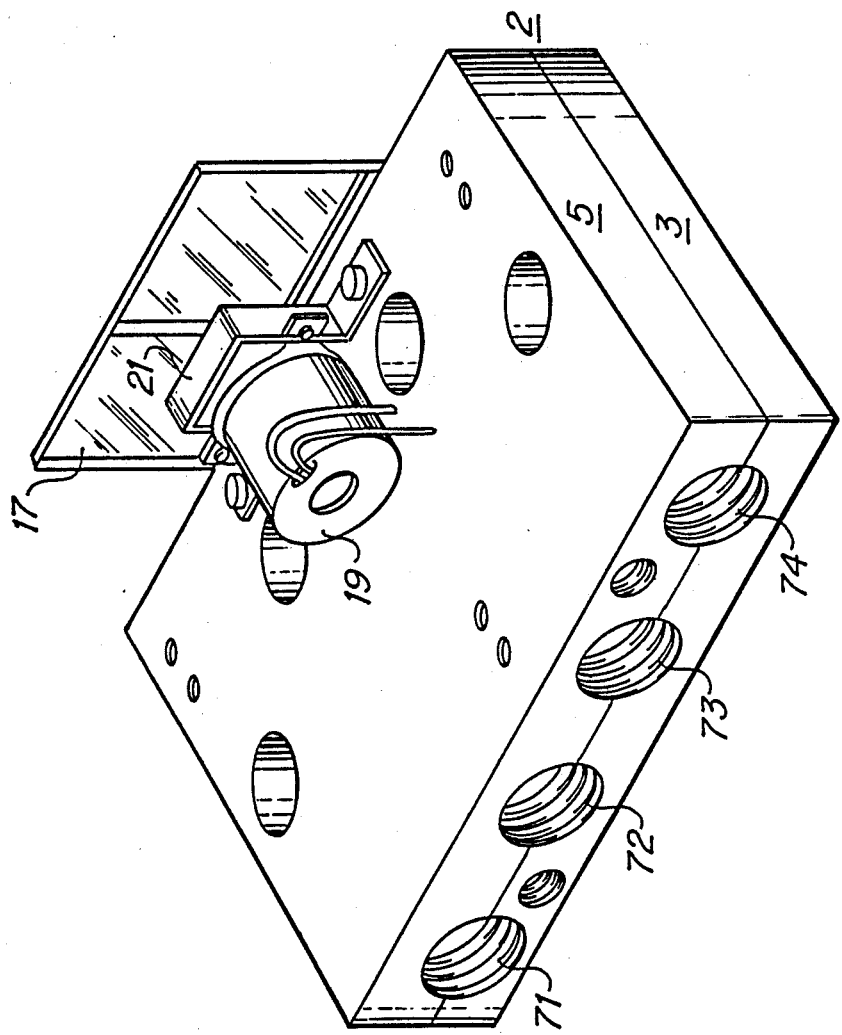
FIG. 3 is a perspective view of the bezel block that houses the ends of the optical fibers.

In FIG. 3, there is shown a perspective view of a bezel block 2 constructed according to the present invention including a lower block 3 and an upper block 5. The color wheel 17 with the associated motor 19 and bracket 21 are illustrated as mounted on the upper block 5. Four ports 71, 72, 73, 74 are provided to accept bundles of optical fibers (not illustrated) for positioning within the interior of the bezel block, as later described herein.

Figure 4:
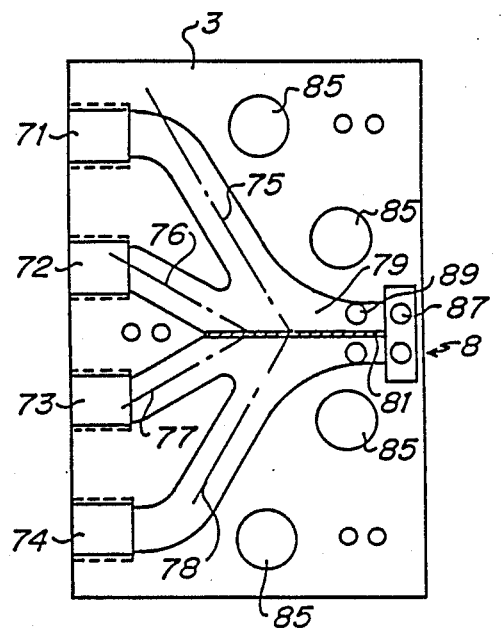
FIG. 4 is a top cut-away sectional view of the block of FIG. 3.

Referring now to FIG. 4, there is shown a cut-away top view of the bottom block 3. The top block 5 may typically be formed substantially in mirror image of the bottom block 3. The outer ports 71, 74 couple to the outer ducts or channels 75, 78, and the inner ports 72, 73 couple to the inner ducts or channels 76, 77 at the central chamber 79 which may be divided by a barrier 81. Thus, a bundle of one or more optical fibers (not pictured) may be inserted through a port 71. Because such bundle (not pictured) is relatively laterally flexible, it may be guided by the sides of duct 75 toward the barrier 81 where the optical fibers of a cable may join with the fibers of another cable that is similarly guided to the central chamber 79 along duct 76.

Generally, the highest degree of light transmission in optical fibers occurs where the light travels in a path substantially parallel to the axis of the optical fiber. As the angle of the light within the optical fiber approaches a critical angle relative to the axis of the fiber, the light exits through the surface of the fiber. Because the barrier 81 is disposed along an axis parallel to a desired direction of illumination, the positioning of the optical fibers in the cables against the barrier 81 causes the fibers to be generally aligned in the direction ideally suited for efficient end illumination.

The bezel block 2 may be made of suitable material, such as aluminum or white (or light-colored) plastic having good spectral reflective properties. These reflective materials provides an advantage in illuminating optical fiber bundles in that light which escapes laterally from the bundles may be re-reflected by the light-colored and reflective interior walls of the ducts 75, 76, 77, 78 back into a fiber for efficient illumination of the fibers by the light source 9.

The bezel block 2 provides standardization of positioning of the ends of optical fibers for maximally efficient illumination. Thus, even where it is necessary to exchange or replace a cable of optical fibers the fibers may be inserted via ports 71–74 and ducts 75–78 into proper position for uniform illumination characteristics from one installation to the next. Similarly, for devices mass produced according to the present invention, the bezel block 2 serves as an assembly guide leading to more rapid manufacture, and greater consistency in results and greater ease in identifying faulty components. The ducts 75–78 are contoured to avoid bending a fiber at an angle acute enough to cause light to exit through the surface of the fiber.

Additionally, a bezel block 2 formed of plastic material provides heat insulation for the protection of the relatively heat-intolerant plastic optical fibers from heat damage. Alternatively, a material such as aluminum may be used where ample cooling of the block is provided or where less heat-sensitive glass fibers are used. To further aid in maintaining the bezel block and the optical fibers housed therein at low operating temperatures, ventilation of the block is provided by means of through-holes 85 and 87 and 89. The ends of the optical fibers are illuminated in the vicinity of the illumination window 8 which the ends 7 of the optical fibers are positioned. The ends are therefore positioned substantially in the place of maximally-focused light from source 9. As an unwanted consequence of focusing visible light at this location, infrared radiation may also be concentrated at such location. Accordingly, ventilating holes 87, 89 are disposed in close association with the ends 7 of the optical fibers to promote cooling by convection via air flowing through the housing and bezel block 2.

FIG. 5 is a simplified cross-sectional view of the bezel block 2 which illustrates pictorially the orientation of optical fiber within a duct to the illumination location. The block 2 includes an upper part 5 and a lower part 3 and includes a forward vent hole 87 into chamber 96 and another vent hole 89, through the forward position of a duct 75 near the location at which the ends 7 of the optical fibers are illuminated. The ends of the optical fibers to be illuminated are positioned near, but preferably not in contact with, a first window 92 of dichroic material which is spaced from a second window 95 of dichroic material or plain glass to form the chamber 96 between them.

Cooling is enhanced by passing air through the chamber 96 and through the forward end of the duct 75. This air flows through a notch 97 disposed beneath the motor 19 which is thereby cooled by the flow of air. The vent hole 87 passes air through the chamber 96 formed between the windows 92, 95 to assure that the first window 92 is maintained cool and to reduce the possibility of heat buildup and transfer to the ends 7 of the optical fibers 1 by convection or conduction. Preferably, the windows 92, 95 are formed of materials which reflect infrared radiation but transmit visible light. The Spring 93 may be a generally rectangular, U-shaped spring that is situated within the chamber 96 at the extreme edges of the windows 92, 95 to permit light to pass through them without interference. Any means of urging the two windows apart which does not interfere with the passage of light may also be used. Preferably, the upper block 5 and lower block 3 are constructed with a restraining edge about the illumination port 8 to facilitate the placement and easy slide removal of the windows for cleaning or replacement.

In accordance with one embodiment, the light source 9 is an incandescent bulb having a filament 101 that is positioned substantially within the circle described by the foci of the ellipsoidal reflector 15 and that is oriented perpendicular to the direction of illumination. It has been found that such orientation and positioning of the filament 101 increases the efficiency of illumination of optical fibers because the reflected light describes a generally smaller steradian angle than is found with the filament 101 is oriented parallel to the direction of illumination in a similarly dimensioned reflector.

What is claimed is:

1. A lighting apparatus for optical fibers comprising:
a case having an aperture for admitting optical fibers and a means for positioning optical fibers;
an airflow means for inducing a flow of air through and within said case;
a light source disposed to supply light to an end of an optical fiber;
exhaust holes communicating the interior with the exterior of said case whereby the flow of air induced by said airflow means may be exhausted from the interior of said case;
a first air intake means adapted to admit a stream of ambient air from the exterior of said case to the interior of said case and additionally to direct said stream of air across said light source; and
a second air intake means adapted to admit ambient air into the interior of said case there to mix with said stream of air which has been directed across said light source.

2. A lighting apparatus as in claim 1 wherein said airflow inducing means is an electric fan.

3. A lighting apparatus as in claim 1 wherein said light source comprises an incandescent bulb and a reflector.

4. A lighting apparatus as in claim 3 wherein said reflector comprises a dichroic material formed into an ellipsoidal reflector and where the filament of said incandescent bulb is disposed substantially perpendicular to the direction of illumination and is disposed within a circle described by the foci of the ellipsoidal reflector.

5. A lighting apparatus as in claim 1 wherein said first air intake means comprises a plurality of holes and wherein second air intake means comprises a plurality of holes.

6. A lighting apparatus as in claim 5 wherein said light source is disposed substantially between the holes comprising said first air intake means and said airflow means whereby the flow of air induced through said first air intake means will be directed across said light source.

7. A lighting apparatus as in claim 6 wherein the holes comprising said second air intake means are located substantially remote from the holes comprising said first air intake means, said second air intake means having a larger total area than said first air intake means.

8. A lighting apparatus as in claim 7 wherein the holes comprising said second air intake means describe an area approximately one-third greater than the area described by the holes comprising said first air intake means.

9. A lighting apparatus as in claim 1 comprising at least one optical filter means disposed intermediate the light source and said end of said optical fiber wherein said optical filter means is adapted to transmit desired light wavelengths and reflect undesired wavelengths.

10. A lighting apparatus as in claim 1 wherein said means for positioning optical fibers comprises a plurality of passages therethrough adapted to permit the passage of cooling air therethrough.

11. A lighting apparatus as in claim 10 comprising a pair of spaced, substantially transparent windows located adjacent said end of said optical fiber and through which said light source may illuminate said end, said windows further adapted and located to permit a flow of cooling air therebetween.

12. A lighting apparatus as in claim 11 wherein said windows are located within said means for positioning optical fibers and wherein openings through said means for positioning optical fibers are provided to permit the flow of air between said windows.

13. The method of illuminating a plurality of optical fibers from a light source comprising the steps of:
bundling the optical fibers to substantially align the fibers near a common end thereof;
focusing the light source within an area approximately the sectional area of the bundled end of the optical fibers;
positioning the bundled end of optical fibers near the focused area of light;
generating a flow of air past said light source so as to provide cooling;
providing a second flow of air to mix with said first flow of said, said second flow of air not being substantially directed past said light source; and
illuminating the light source.

14. The method of claim 13 comprising the steps of:
interposing a stream of moving air between the light source and the bundled end of the optical fiber.

15. The method of claim 14 comprising the step of providing transparent barriers axially spaced between the bundled end of optical fibers and the light source along the axis of transmitted light wherein a stream air is passed between said transparent barriers.

16. The method of claim 13 wherein the step of generating a flow of air is accomplished by providing a fan having an up stream side and down stream side and placing said fan within a housing which also encloses said light source and said bundled end of optical fibers whereby an upstream area and a downstream area are defined within said housing whereby air will tend to move from said upstream area to said downstream area;
said step of providing a first stream of air further characterized by placing an aperture in said housing in close association with said light source whereby air drawn in through said aperture from the exterior of said housing will be directed toward said light source; and
said step of providing a second air source further characterized in locating apertures capable of admitting exterior air remote from said first apertures such that the stream of air entering therethrough will not be substantially directed against said light source; and
mixing said first stream and second stream of air.

* * * * *